US008595139B2

(12) United States Patent
Maruyama et al.

(10) Patent No.: US 8,595,139 B2
(45) Date of Patent: Nov. 26, 2013

(54) CONTENT DISTRIBUTION PROGRAM, CONTENT DISTRIBUTION METHOD, SERVER, CONTENT UTILIZATION APPARATUS, AND CONTENT UTILIZATION SYSTEM

(75) Inventors: Hidefumi Maruyama, Kawasaki (JP); Tetsuhiro Chiba, Kawasaki (JP); Yuuki Hachiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 11/726,740

(22) Filed: Mar. 22, 2007

(65) Prior Publication Data
US 2007/0239619 A1 Oct. 11, 2007

Related U.S. Application Data

(63) Continuation of application No. PCT/JP2004/013927, filed on Sep. 24, 2004.

(51) Int. Cl.
*G06F 21/00* (2013.01)
(52) U.S. Cl.
USPC .................. 705/59; 717/174; 726/30; 726/33
(58) Field of Classification Search
USPC .......................................................... 705/59
See application file for complete search history.

(56) References Cited

U.S. PATENT DOCUMENTS

| 6,226,618 | B1 | 5/2001 | Downs et al. |
| 6,263,313 | B1 | 7/2001 | Milsted et al. |
| 6,345,256 | B1 | 2/2002 | Milsted et al. |
| 6,389,403 | B1 | 5/2002 | Dorak, Jr. |
| 6,389,538 | B1 | 5/2002 | Gruse et al. |
| 6,418,421 | B1 | 7/2002 | Hurtado et al. |
| 6,574,609 | B1 | 6/2003 | Downs et al. |
| 6,587,837 | B1 | 7/2003 | Spagna et al. |
| 2002/0002468 | A1 | 1/2002 | Spagna et al. |
| 2002/0111996 | A1* | 8/2002 | Jones et al. ..................... 709/203 |
| 2003/0037006 | A1* | 2/2003 | Maruyama et al. ............. 705/59 |
| 2003/0105718 | A1 | 6/2003 | Hurtado et al. |
| 2003/0185399 | A1* | 10/2003 | Ishiguro ......................... 380/281 |
| 2005/0044016 | A1* | 2/2005 | Irwin et al. ..................... 705/30 |
| 2005/0071280 | A1* | 3/2005 | Irwin et al. ..................... 705/59 |

FOREIGN PATENT DOCUMENTS

| JP | 2000-196585 | 7/2000 |
| JP | 2001-094549 | 4/2001 |
| JP | 2002-108710 | 4/2002 |
| JP | 2002-522995 | 7/2002 |
| JP | 2002-353951 | 12/2002 |
| JP | 2003-187017 | 7/2003 |
| JP | 2003-216500 | 7/2003 |
| JP | 2003-218851 | 7/2003 |

* cited by examiner

*Primary Examiner* — Jamie Kucab
(74) *Attorney, Agent, or Firm* — Greer, Burns & Crain, Ltd.

(57) ABSTRACT

An encrypted content and a license are separated from each other to be distributed individually, so that the encrypted content is decrypted using the license in a user apparatus. A server encrypts licenses of a plurality of encrypted contents for package sale to generate an inactive license packaged in one file and distribute the inactive license to a user terminal utilizing an activation license for package sale. An activation license for package sale is distributed in response to a purchase request from the user terminal, a plurality of encrypted licenses contained in the inactive license are decrypted, an encrypted content contained in an object for package sale is decrypted using a license corresponding thereto so that the decrypted content is reproduced.

5 Claims, 17 Drawing Sheets

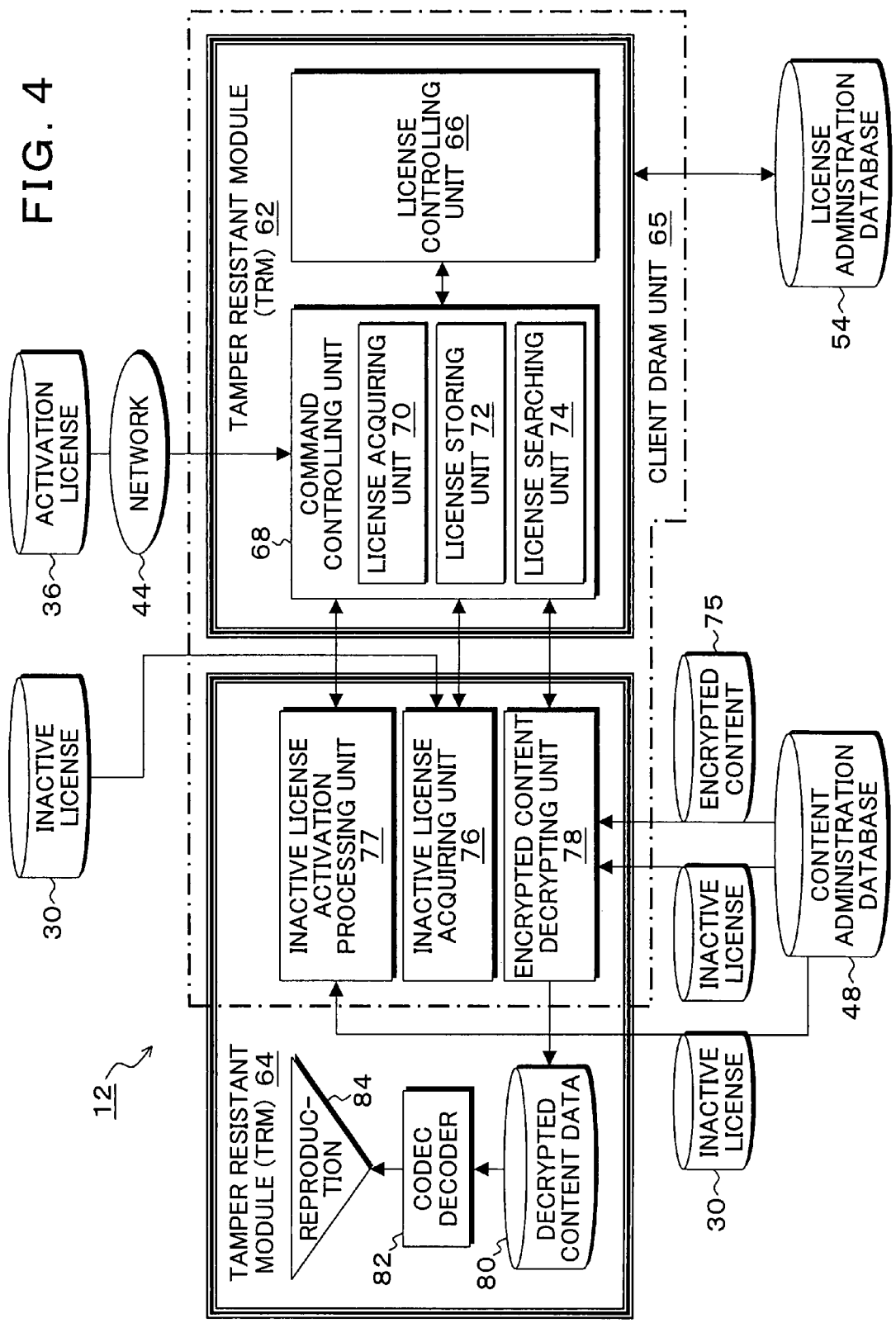

| CONTENT ID | NUMBER OF REPRODUCTION TIMES | REPRODUCIBLE PERIOD | NUMBER OF REPRODUCIBLE BYTES | PRICE |
|---|---|---|---|---|
| 001 | 3 | BY 01 SEPTEMBER 2006 | 1MB | CHARGE-FREE |
| 002 | UNRESTRAINT | BY 01 APRIL 2006 | 4MB | ¥700 |
| 003 | UNRESTRAINT | 6 MONTHS FROM THE MONTH OF PURCHASE | 4MB | ¥1000 |
| 004 | UNRESTRAINT | BY 01 APRIL 2006 | 4MB | ¥400 |
| 005 | 3 | 3 MONTHS FROM THE DAY OF PURCHASE | 1MB | CHARGE-FREE |

| PACKAGE ID | NUMBER OF REPRODUCTION TIMES | REPRODUCIBLE PERIOD | NUMBER OF REPRODUCIBLE BYTES | PRICE |
|---|---|---|---|---|
| 001 | 3 | BY 01 SEPTEMBER 2006 | 1MB | CHARGE-FREE |
| 002 | UNRESTRAINT | 6 MONTHS FROM THE MONTH OF PURCHASE | 4MB | ¥1500 |

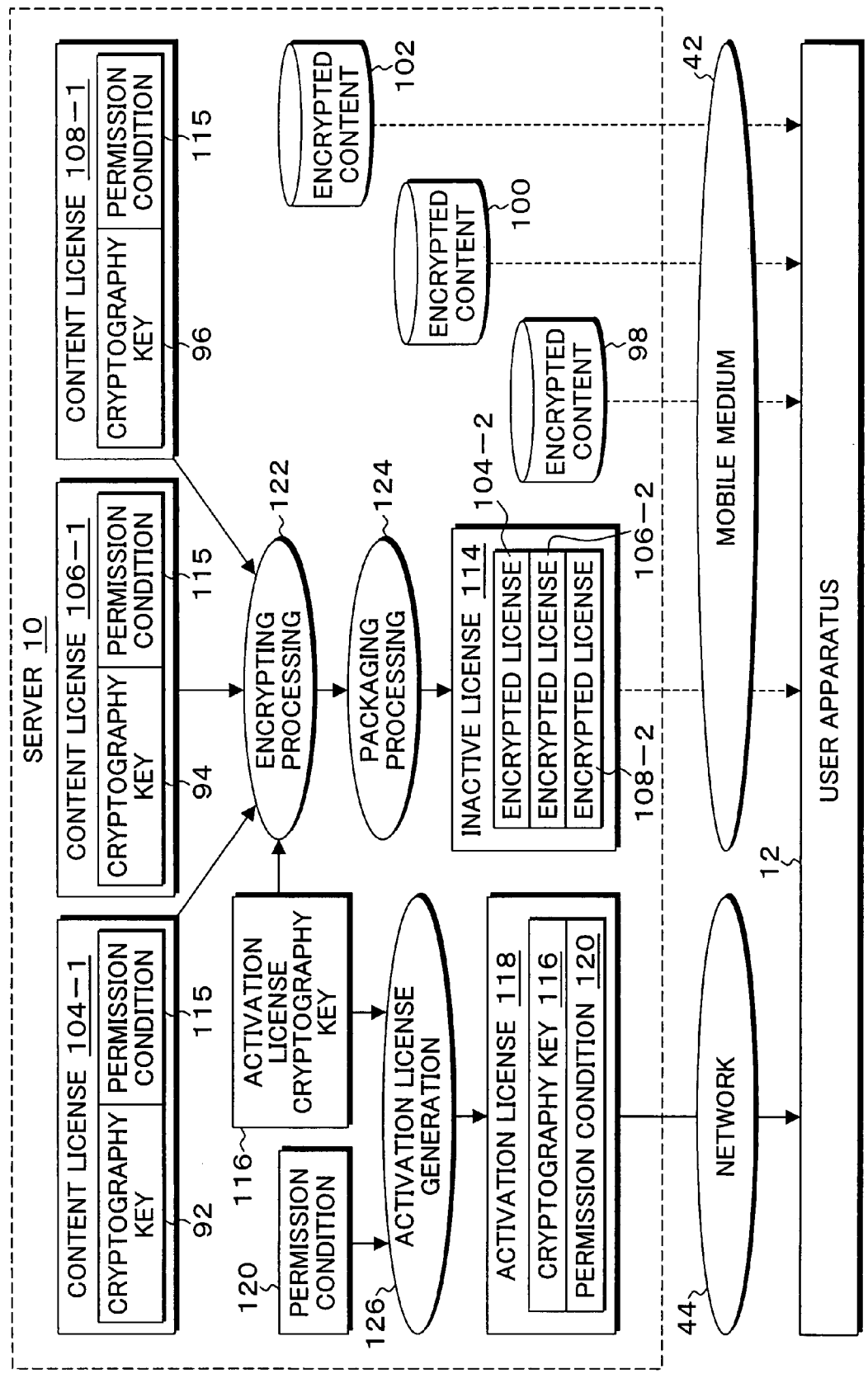

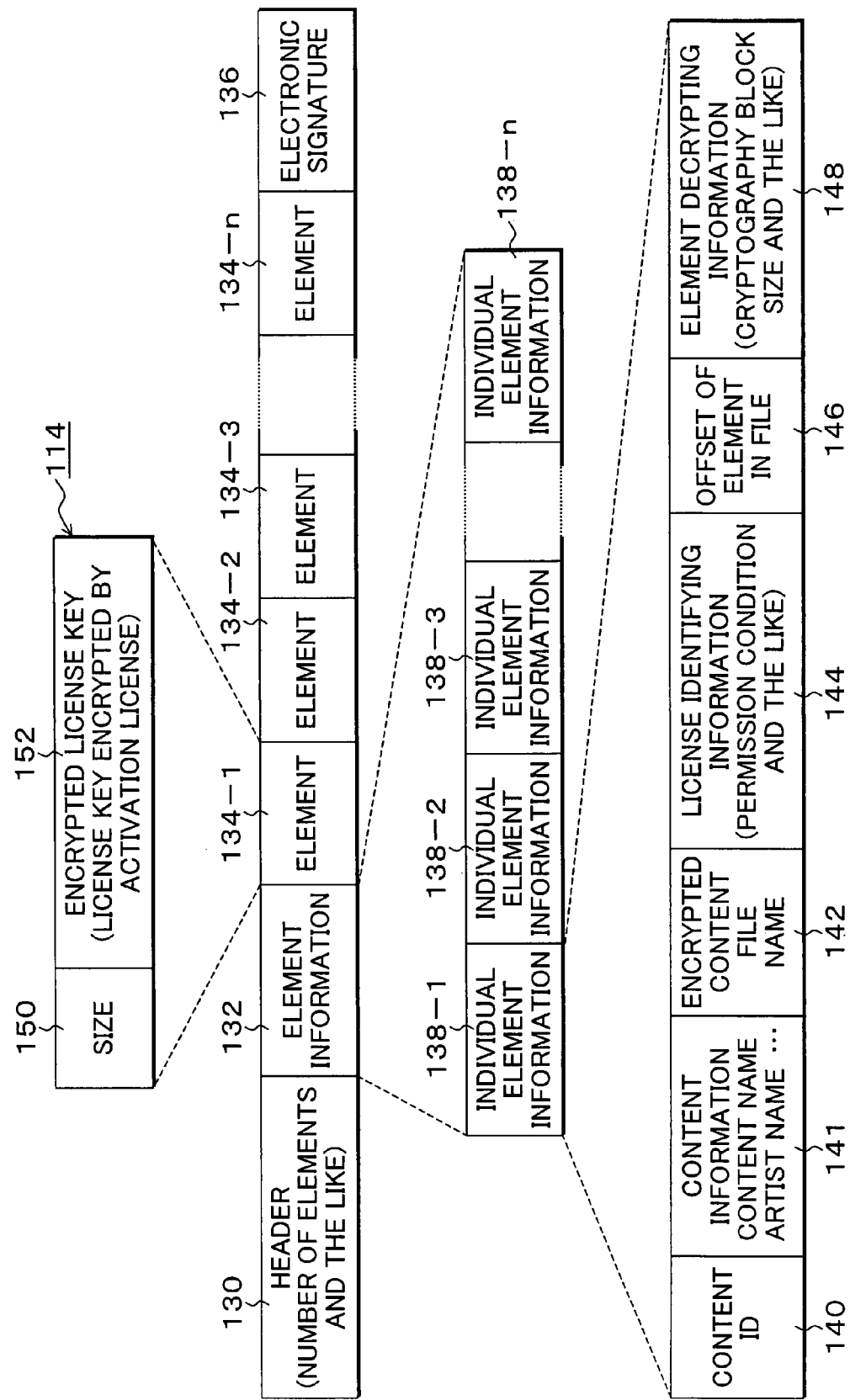

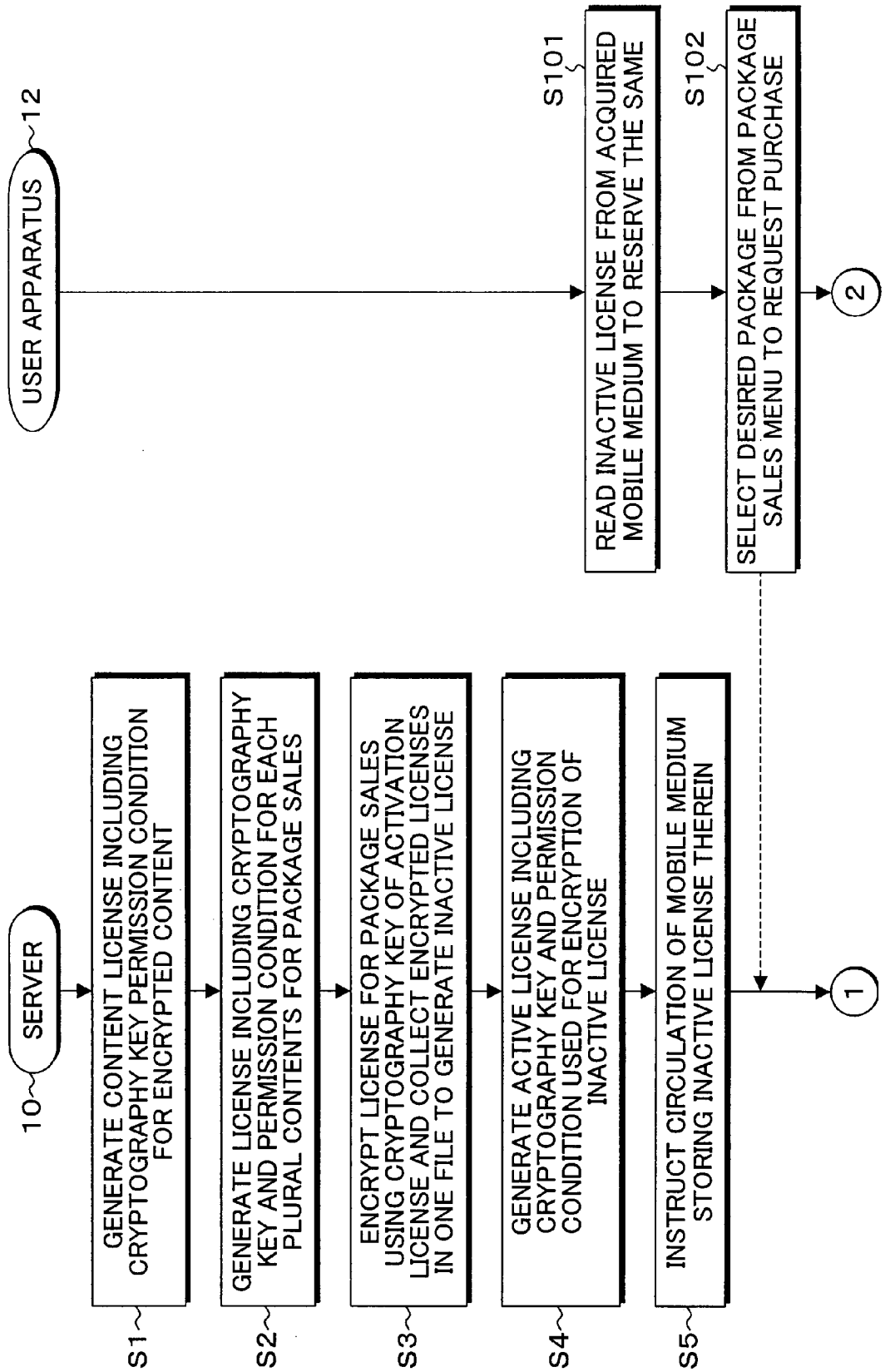

CONTENT DISTRIBUTION PROGRAM, CONTENT DISTRIBUTION METHOD, SERVER, CONTENT UTILIZATION APPARATUS, AND CONTENT UTILIZATION SYSTEM

This is a continuation of International Application No. PCT/JP2004/013927, filed Sep. 24, 2004.

FIELD OF THE INVENTION

Recently, according to higher speed and larger capacity of a network, and higher performance of a personal computer, contents such as music, video, photography document, or the like are digitized and they are widely distributed on Internet or though movable mediums such as a DVD.

DESCRIPTION OF RELATED ART

Since such digital content can be copied easily, and degradation thereof due to the copying is slight, Digital Right Management system (DRM) for protecting the content such that digital data of the content is not exposed is inevitable in content distribution on network or through a mobile medium. In the DRM, content is encrypted and distributed, while a user acquires a license to decrypt the encrypted content and reproduce the same. In such a distribution system for digital contents, super-distribution where content and its license are distributed independently of each other have been known, where, when a user wish to acquire and reserve an encrypted content from a content distribution server or a mobile medium without charge to reproduce the same, he/she purchases a license from the content distribution server and decrypts the encrypted content according to the purchased license to reproduce and utilize the content. Further, sales of digital content include a package sale for selling a plurality of contents collectively besides individual utilizations of individual contents. The package sale is, for example, an album sale of music contents and it takes a system similar to a system where CDs are produced and sold for each album. In the package sale of digital contents, a plurality of contents are encrypted according to a license to a package and an encrypted content package file packaged to one file is generated and distributed. Simultaneously, a license used for packaging is distributed in response to a purchase request from a user for his/her utilization.

Patent Literature 1: JP-A-2001-094549
Patent Literature 2: JP-A-2003-187017
Patent Literature 3: JP-A-2003-218851
Patent Literature 4: JP-A-2002-108710

In such a conventional package sale of digital contents, however, individual contents are encrypted and distributed, and even if licenses for the individual contents have been already sold out, when these contents are collected and sold as a package, contents are encrypted and distributed for each package again, which results in trouble and increase in cost.

In a user apparatus, in addition to individual encrypted contents, a storing region for a package including these contents is required, and when the encrypted contents are redundantly reserved and the encrypted contents are copied in a built-in fixed hard disk and utilized in the user apparatus, such a problem arises that the storing region of the user apparatus is used wastefully.

Further, when an encrypted content is distributed using a mobile medium such as a CD or a DVD, encrypted contents which are individually sold are redundantly distributed for a package sale, which results in requirement for more mobile mediums. As a result, when the number of packages to which one content belongs is increased, an operational cost increases and user burden becomes large.

BRIEF SUMMARY OF THE INVENTION

An object of the present invention is to provide a content distribution program and method, a server, and a content utilization apparatus and system, where regarding package sales of contents, a package including licenses of a plurality of encrypted contents for package sale is encrypted and distributed, and an operation cost for encrypted contents for the package sale is reduced using the encrypted contents distributed with individual licenses.

One aspect of the present invention provides a content distribution program executed by a computer constituting a server.

The content distribution program of the present invention causes a computer constituting a server which separates an encrypted content and a license from each other to distribute the encrypted content and the license individually. The program also causes a user apparatus and to decrypt the encrypted content to reproduce the same based upon the license. The program causes the server to generate an activation license for package sale, and encrypt licenses of a plurality of encrypted contents for package sale using the activation license to generate an inactive license packaged to one file.

The server then distributes the inactive license to a user terminal. When the server receives and processes a purchase request of the package from the user terminal, the program causes the server to distribute the activation license for decrypting a plurality of encrypted licenses contained in the inactive license and decrypting an encrypted content contained in an object for the package sale using a license corresponding thereto to reproduce the decrypted content.

Here, the activation license generating step generates the activation license including a cryptography key encrypting the licenses of a plurality of encrypted contents for package sale and a permission condition of the plurality of encrypted contents for package sale.

The inactive license generating step stores the inactive license together with the encrypted contents in a mobile medium to provide the mobile medium to the user apparatus.

The inactive license generating step generates the inactive license incorporated with metadata constituting an album with contents to be packaged in addition to the cryptography key and the permission condition. The user apparatus reads a plurality of encrypted contents corresponding to the metadata of the inactive license to reproduce contents according to the constitution of the album.

Another aspect of the present invention provides a content utilization program executed by a computer constituting a user apparatus.

The content utilization program of the present invention causes a computer constituting a user apparatus which acquires an encrypted content and a license thereof provided separately to decrypt the encrypted content based on the license and reproduce the same to execute;

a content acquiring step of acquiring a plurality of encrypted contents for package sale to reserve the encrypted contents;

an inactive license acquiring step of encrypting licenses of a plurality of encrypted contents for package sale using an activation license to acquire and reserve an inactive license packaged to one file;

an activation license acquiring step of acquiring and reserving an activation license corresponding to the inactive license according to a package purchase request to the server;

an inactive license activating step of decrypting a plurality of encrypted licenses contained in the inactive license utilizing the activation license and storing the decrypted licenses in a secure license management database; and a content reproduction processing step of decrypting an encrypted content contained in an object for the package sale using a corresponding license to reproduce the decrypted content.

Here, the activation license includes a cryptography key encrypting the licenses of a plurality of encrypted contents for package sale and a permission condition to the plurality of encrypted contents for package sale.

The encrypted content acquiring step and the inactive license acquiring step read and reserve an encrypted content and an inactive license stored in a mobile medium.

The content reproduction processing step decrypts an acquired single encrypted content by searching a license corresponding thereto and stored in the license management database and using the searched license to reproduce the acquired single encrypted content.

The inactive license acquiring step acquires an inactive license incorporated with metadata constituting an album with contents to be packaged in addition to the cryptography key and the permission condition, and the content reproduction processing step acquires a plurality of encrypted contents corresponding to the metadata of the inactive license to reproduce the contents according to the constitution of the album.

Still another aspect of the present invention is a content distribution method which separates an encrypted content and a license thereof to distribute the content and the license individually, and causes a user apparatus to decrypt the encrypted content based upon the license and reproduce the decrypted content. According to the method, the server generates an activation license for package Sale and encrypts licenses of a plurality of encrypted contents for package sale using the activation license to generate an inactive license packaged to one file. The server then distributes the inactive license to a user terminal.

When the server receives and processes a purchase request of the package from the user terminal, the server distributes the activation license corresponding to the inactive license.

Here, the activation license generating step generates the activation license including a cryptography key encrypting the licenses of a plurality of encrypted contents for package sale and a permission condition of the plurality of encrypted contents for package sale.

The inactive license generating step stores the inactive license together with the encrypted contents in a mobile medium to provide the mobile medium to the user apparatus.

The inactive license generating step generates the inactive license incorporated with metadata constituting an album with contents to be packaged in addition to the cryptography key and the permission condition. The user apparatus reads a plurality of encrypted contents corresponding to the metadata of the inactive license to reproduce contents according to the constitution of the album.

Another aspect of the present invention is a content utilization method which acquires an encrypted content and a license thereof provided separately to decrypt the encrypted content based on the license to reproduce the same, comprising:

a content acquiring step of acquiring and reserving a plurality of encrypted contents for package sale;

an inactive license acquiring step of encrypting licenses of a plurality of encrypted contents for package sale using an activation license to acquire and reserve an inactive license packaged to one file by;

an activation license acquiring step of acquiring and reserving an activation license according to a package purchase request to the server;

an inactive license activating step of decrypting a plurality of encrypted licenses contained in the inactive license utilizing the activation license and storing the decrypted licenses in a secure license management database; and a content reproduction processing step of decrypting an encrypted content contained in an object for the package sale using a license corresponding to the encrypted content according to content information of the inactive license to reproduce the content.

Yet another aspect of the present invention is a content distribution apparatus (a server) which separates an encrypted content and a license thereof from each other to distribute the content and the license individually and causes a user apparatus to decrypt the encrypted content based upon the license and reproduce the decrypted content, including an activation license generating unit which generates an activation license for package sale, and an inactive license generating unit that encrypts licenses of a plurality of encrypted contents for package sale using the activation license to generate an inactive license packaged to one file.

An inactive license distributing unit distributes the inactive license to a user terminal, and an activation license activating unit, when receiving and processing a purchase request of a package from the user terminal, distributes the activation license to decrypt a plurality of encrypted licenses included in the inactive license and stores the plurality of encrypted licenses decrypted in a secure license management database. An activation license distributing unit decrypts an encrypted content contained in an object for the package sale using a license corresponding to the encrypted content according to content information of the inactive license to reproduce the decrypted content.

Further, another aspect of the present invention is a content utilization apparatus (a server) which acquires an encrypted content and a license thereof provided separately to decrypt the encrypted content based on the license to the same, comprising:

a content acquiring unit which acquires and reserves a plurality of encrypted contents for package sale;

an activation license acquiring unit which encrypts licenses of a plurality of encrypted contents for package sale using an activation license to acquire and reserve an inactive license packaged to one file by;

an activation license acquiring unit which acquires and reserves an activation license according to a package purchase request to the server;

an inactive license activation processing unit which decrypts a plurality of encrypted licenses contained in the inactive license utilizing the activation license and stores the decrypted licenses in a secure license management database; and a content reproduction processing unit which decrypts an encrypted content contained in an object for the package sale using a license corresponding to content information of the inactive license to reproduce the decrypted content.

The present invention also includes a content distribution system where an encrypted content and a license thereof are separated from each other and are distributed individually by a content distribution apparatus (a server) and the encrypted content is decrypted based upon the license and is reproduced by a content utilization apparatus (a user apparatus), wherein the content distribution apparatus comprises:

an activation license generating unit which generates an activation license for package sale;

an inactive license generating unit which encrypts licenses of a plurality of encrypted contents for package sale using the activation license to generate an inactive license packaged to one file by;

an inactive license distributing unit which distributes the inactive license to a user terminal; and an activation license distributing unit which distributes the activation license when receiving a purchase request from the user terminal to process the same, and the content utilization apparatus comprises a content acquiring unit which acquires and reserves the encrypted content;

an inactive license acquiring unit which acquires and reserves the inactive license;

an activation license acquiring unit which acquires and reserves the activation license according to a package purchase request to the content distribution apparatus;

an inactive license activation processing unit which decrypts a plurality of encrypted licenses included in the inactive license using the activation license to store the plurality of encrypted licenses decrypted into a secure license management database; and a content reproduction processing unit which decrypts an encrypted content contained in an object for the package sale using a license corresponding thereto according to content information of the inactive license to reproduce the decrypted content.

Incidentally, the details of the method, the server, and the content utilization apparatus and system are basically the same as those of the content distribution program and content utilization program.

According to various aspects of the present invention, regarding package sale of a plurality of encrypted contents, since the encrypted contents which have been already distributed individually for license sale are utilized, an inactive license packaged to one file by encrypting licenses of encrypted contents for package is generated and distributed without generating encrypted contents newly, and a user is required to only sell an activation license for decrypting the encrypted licenses contained in the inactive license, so that an operational cost of the encrypted contents in a package sale is reduced and simultaneously a storing region of encrypted contents in the user apparatus can be reduced by the individual sale and the package sale sharing the encrypted contents. Further, even if encrypted contents are distributed using mobile mediums such as a DVD, the number of mediums to be used can be restricted to the necessity minimum.

BRIEF DESCRIPTION OF DRAWINGS

FIG. 4 is a block diagram of the user apparatus shown in FIG. 2 provided with a digital right management function;

FIGS. 6A and 6B are explanatory diagrams of a permission condition file provided on the server shown in FIG. 1;

FIG. 7 is an explanatory diagram of a generating function of a license for package sale in the server shown in FIG. 1;

FIG. 8 is an explanatory diagram of a data structure of an inactive license generated in the present invention;

FIGS. 11A and 11B are time charts of a content distribution processing and a utilization processing in the server shown in FIG. 1 and the user apparatus shown in FIG. 2;

DETAILED DESCRIPTION

Figure 1:
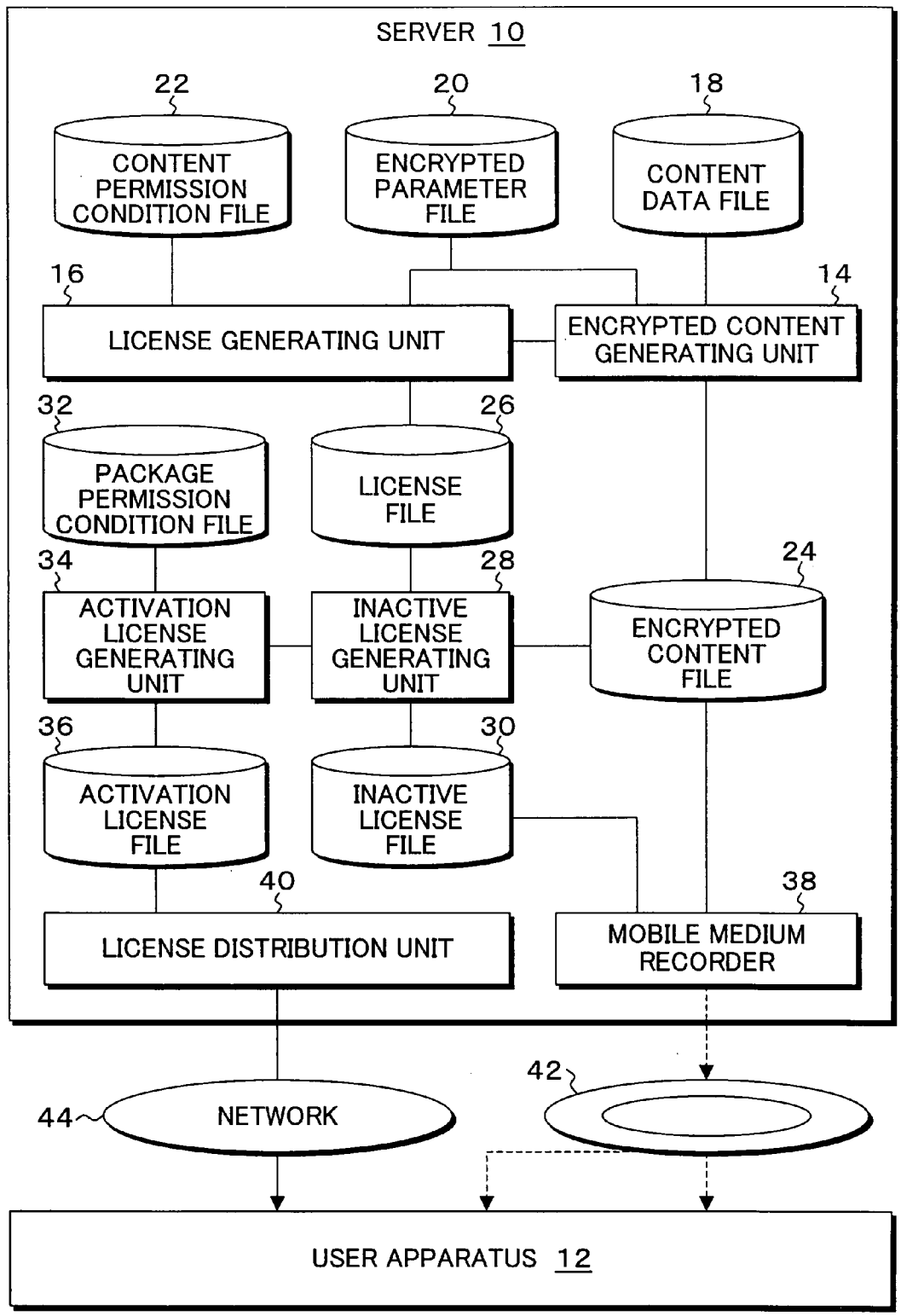
FIG. 1 is a block diagram of a system configuration of the present invention.

FIG. 1 is a block diagram of a system configuration of the present invention for package sale of contents. In FIG. 1, a content distribution system is configured with a server 10 functioning as a center apparatus on a content distribution side and a user apparatus (a content utilization apparatus) 12 functioning as a client. Of course, a plurality of user apparatuses 12 may be present corresponding to the server 10, but a configuration having only one user apparatus 12 is explained as an example. The server 10 is provided with an encrypted content generating unit 14, a license generating unit 16, an inactive license generating unit 28, an activation license generating unit 34, a mobile medium recorder 38, and a license distributing unit 40. The server 10 includes a content data file 18, an encrypted parameter file 20, a content permission condition file 22, an encrypted content file 24, a license file 26, an inactive license file 30, a package permission condition file 32, and an activation license file 36 as data files used in respective processing units. The encrypted content generating unit 14 in the server 10 encrypts individual contents stored in the content data file 18 using a cryptography key used in a license for content generated in the license generating unit 16 to generate encrypted contents, and stores the encrypted contents in the encrypted content file 24. The encrypted contents are stored in the encrypted content file 24 for respective individual contents. The license generating unit 16 generates licenses to respective contents encrypted by the encrypted content generating unit 14. In generation of licenses for content, a license is generated by acquiring a cryptography key from the encrypted parameter file 20 and acquiring a permission condition from the content permission condition file 22. Generations of an encrypted content and a license thereof performed by the encrypted content generating unit 14 and the license generating unit 16 correspond to processing portions for respective contents in the conventional system. In addition thereto, a license for selling a plurality of contents as a package is generated by the inactive license generating unit 28 and the activation license generating unit 34 in the present invention. The activation license generating unit 34 generates an activation license for package sale used for encrypting licenses of a plurality of encrypted contents. That is, the activation license generating unit 34 acquires a permission condition required for package sale from the package permission condition file 32 and acquires a cryptography key from the license file 26 to generate an activation license. The activation license generated in the activation license generating unit 34 is stored the activation license file 36. The inactive license generating unit 28 acquires licenses of a plurality of encrypted contents for package sale from the license file 26 and generates an inactive license packaged in one file by encrypting each license using a cryptography key of activation license generated in the activation license generating unit 34, and stores the generated inactive license in the inactive license file 30. In this embodiment, the mobile medium recorder 38 records an encrypted content stored in the encrypted content file 24 and an inactive license stored in the inactive license file 30 in a mobile medium 42 to distribute the same in the market. As the mobile medium, a CD, a DVD, a removable HD, or the like is used. The reason why the mobile medium 42 is used for distribution of content is because a data amount of encrypted contents and an inactive license for package sale is voluminous, which would result in an increase of cost in network communication. Of course, if a problem about the communication cost is overcome, encrypted contents and an inactive license for package sale may be network-distributed through the network 44 instead of or in addition to distributing on mobile mediums. When the license distributing unit 40 receives a content purchase request of contents packaged from the user apparatus 12 and completes a purchase processing, it distributes a corresponding activation license stored in the activation license file 36 to the user apparatus 12 through the network 44. Here, the contents distributed from the server 10 include any contents such as music, video, Karaoke, map, game, electronic book, or Rakugo. Distribution of contents from the server 10 is performed through a so-called "super-distribution" where content and license are respectively encrypted to be put in distribution. In the following explanation, the encrypted content file 24, the inactive license file 30, and the activated license file 36 may be simply expressed as an encrypted content 24, an inactive license 30, and an activated license 36.

Figure 2:
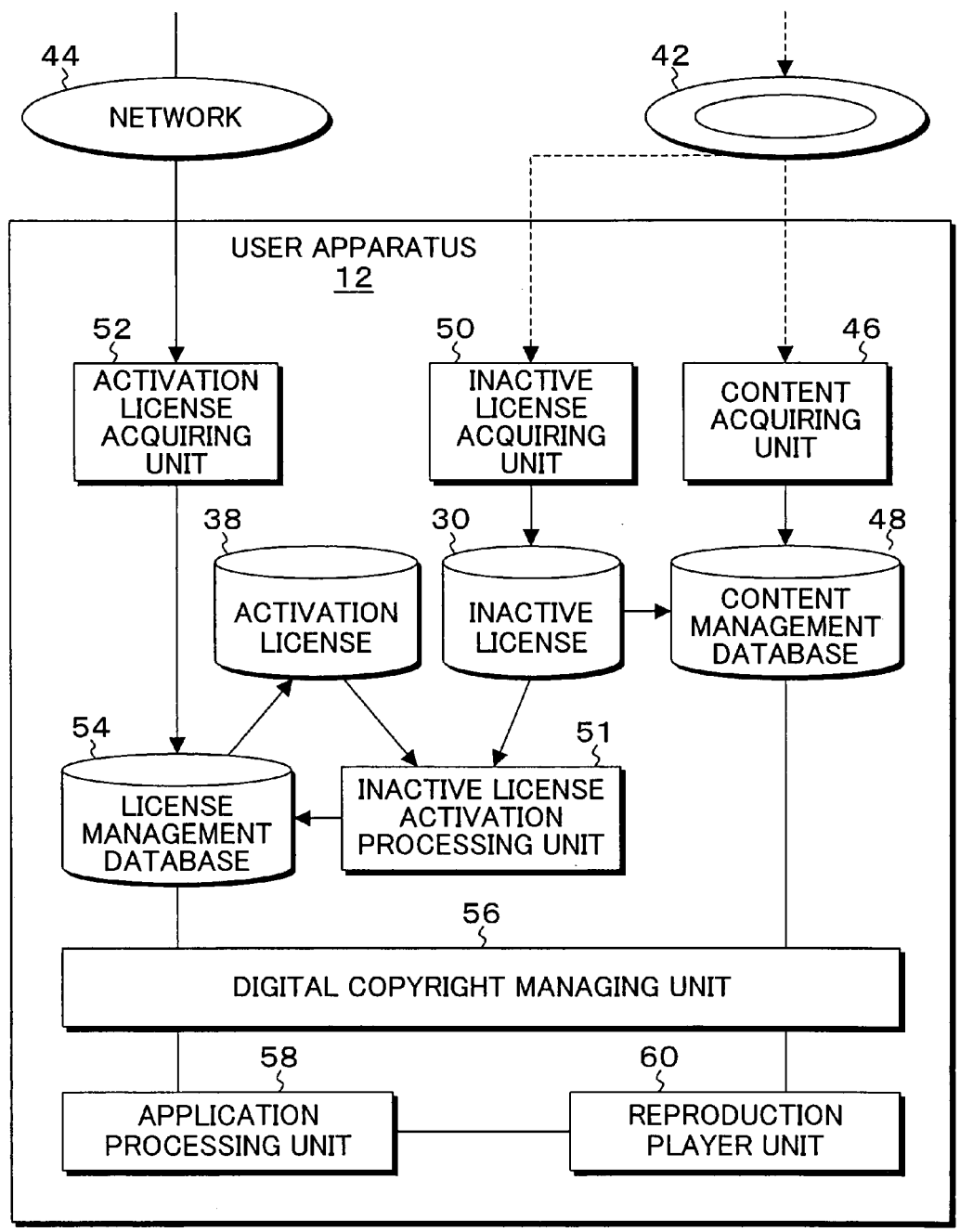
FIG. 2 is a block diagram of a user apparatus shown in FIG. 1.

As shown in FIG. 2, the user apparatus 12 functioning as a content utilization apparatus is provided with a content acquiring unit 46, a content management database 48, an inactive license acquiring unit 50, an inactive license activation processing unit 51, an activation license acquiring unit 52, a license management data 54, a digital right managing unit 56, an application processing unit 58, and a reproduction player unit 60. As the user apparatus 12, there are a personal computer, a PDA, a vehicle-mounted terminal, an STB, a portable phone, and the like. When a mobile medium 42 is loaded in a drive, the content acquiring unit 46 in the user apparatus 12 reads an encrypted content stored in the mobile medium 42 to store the same in the content management database 48, and when an inactive license used in package sale is stored in the mobile medium 42, the inactive license acquiring unit 50 reads an inactive license to store the same in the content management database 48. The content acquiring unit 46 acquires encrypted contents which are individually distributed to reserve them in the content management database 48 directly regardless of contents for package sale distributed from the server 10. Therefore, when contents sold as a package should be reproduced in the user apparatus 12, all encrypted contents for package are not reserved in the content management database 48 necessarily, and when contents sold as a package are utilized according to license acquisition, an encrypted content which is contained in a content object but is not reserved is newly acquired through a mobile medium 42 or a network distribution to be reserved in the content management database 48. That is, a license acquired for package sale and contents to be sold as a package are distributed separately, where, regarding the contents, only distribution of encrypted contents is performed assuming utilization of individual contents using licenses but contents for such a system where package sale are collectively encrypted and distributed is not adopted. When a license of a plurality of contents sold as a package (for example, contents taking an album configuration), should be acquired, the activation license acquiring unit 52 issues a purchase request of an activation license required for reproduction of the contents sold as a package to the server 10 and it acquires an activation license for a package sale via the network 44 from the server 10 to store the same in the license management database 54 after a charging processing to the purchase request has been terminated and a purchase processing has been terminated. The digital right managing unit 56 functions as a DRM client to the server 10 and acquires an activation license from the license management database 54 in the inactive license activation processing unit 51 based upon user's content selection to display a menu of contents, for example, having an album configuration, for package sale performed by the application processing unit 58. The digital right managing unit 56 acquires an inactive license for package from the content management database 48 to decrypt encrypted licenses corresponding to a plurality of encrypted contents contained in the inactive license according to the cryptography key of the activation license, and stores decrypted licenses key for contents in the license management database 54. Thereafter, the digital right managing unit 56 reads an inactive license for package sale corresponding to the selected menu from the content management database 48, reads a corresponding encrypted content from the content management database 48 according to content information in the inactive license, acquires the license for content from the license management database 54, decrypts the encrypted content using the cryptography key of the license for content to generate content data, and outputs the content data to the reproduction player unit 60, where an reproducing operation of the content is performed. That is, the digital right managing unit 56 functions as a content reproduction processing unit in the user apparatus 12 and decrypts an encrypted content included in encrypted contents for package sale according to content information in the inactive license to reproduce the content.

Figure 3:
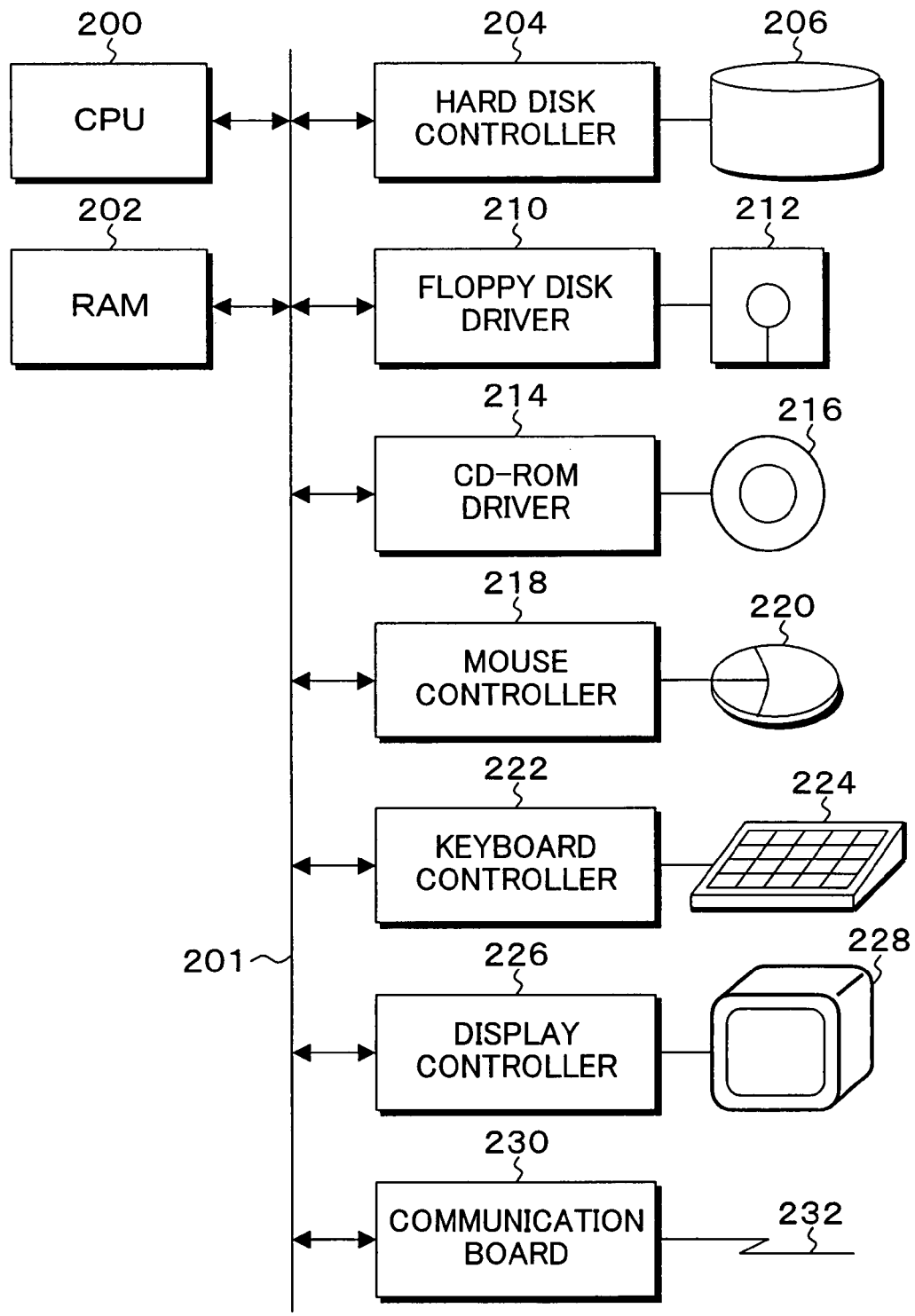
FIG. 3 is a block diagram of a hardware environment of a computer applied with a server shown in FIG. 1.

FIG. 3 is a block diagram of a hardware environment of a computer applied to the sever 10 shown in FIG. 1. In the computer shown in FIG. 2, a bus 201 of a CPU 200 is connected with a RAM 202, a hard disk controller (soft) 204, a floppy disk drive (soft) 210, a CD-ROM drive (soft) 214, a mouse controller 218, a keyboard controller 222, a display controller 226, and a communication board 230. The hard disk controller 204 is connected with a hard disk drive 206, and is loaded with programs executing a content distribution processing for a package sale of the present invention, and it calls a required program from the hard disk drive 206 to develop the same on the RAM 202 and causes the CPU 200 to execute it at an activation of the computer. The floppy disk driver 210 is connected with a floppy disk drive (hard) 212, and it can perform reading and writing to a floppy disk (R). A CD-ROM 214 is connected with a CD drive (hard) 216 and it can read data or a program stored in a CD. The mouse controller 218 transmits an input operation of a mouse 220 to the CPU 200. The keyboard controller 222 transmits an input operation of a keyboard 224 to the CPU 200. The display controller 226 performs display on a display unit 228. A communication board 230 uses a communication line 232 including wireless to perform communication with apparatuses within a network or an apparatus via LAN on external Internet.

FIG. 4 is a block diagram of the user apparatus shown in FIG. 2 provided with a digital right management function (DRM function). In FIG. 4, the user apparatus 12 is composed of tamper resistant modules (TRMs) 62 and 64. The TRM 62 is provided with a license control unit 66 and a command control unit 68. The command control unit 68 includes a license acquiring unit 70, a license storing unit 72, and a license searching unit 74. The TRM 62 performs reservation, search, and read of a license to the license management database 54. The TRM 64 includes an inactive license activation processing unit 72, an encrypted content decrypting unit 78, decrypted content data 80, a CODIC decoder 82, and a reproducing unit 84. A section including the license control unit 66, the command control unit 68, the inactive license acquiring unit 76, and the encrypted content decrypting unit 78 constitutes the client DRM unit 65 according to the present invention to the TRMs 62 and 64. The TRMs 62 and 64 are established using a hardware and a software for protection from unauthorized access performed by a third party. IEEE1394 or DTPC (Dynamic Tuning Control Protocol) is used in connection of a device of a mobile medium to the TRMs 62 and 64, for example, in such a case that a drive is connected via a USB port, where encrypted data is transmitted and received. When a LAN is used via the network 44, encryption transmission using SSL (Secure Socket Layer) or IPSEC (IP Security Protocol) is adopted. In data transmission between the user apparatus 12 and the server 10, after mutual authentication and exchange of keys are conducted between the both, for example, data transmission of an activation license encrypted according to a hybrid system is performed. In encryption according to the hybrid system, pseudo-random number is generated to generate a session key on the side of a transmission and the session key is encrypted using a public key of a reception side obtained by the first key exchange, while a transmission message is transmitted after it is encrypted using the session key to be connected. On the reception side, a received encrypted session key is decrypted based upon an encrypted secret key (private key) and the received encrypted message is decrypted using the decrypted session key. In a processing operation in the user apparatus 12 shown in FIG. 4, the inactive license acquiring unit 76 provided in the TRM 62 reads an inactive license 30 for a package sale from such a mobile medium as a DVD to reserve the same in the content management database 48. The license acquiring unit 70 acquires an activation license 38 corresponding to the inactive license 30 via the network 44 according to a purchase request for a package to reserve the license 38 in the license management database 54 via the license control unit 66. In reproduction of contents sold as a package, the inactive license activation processing unit 77 provided on the side of the TRM 64 reads the inactive license 30 corresponding to a package to be reproduced from the content management database 48 and acquires an activation license corresponding to the inactive license 30 through access to the license searching unit 74. Encrypted licenses of a plurality of contents contained in the inactive license is decrypted using the cryptography key of the acquired activation license and the encrypted licenses for the plurality of contents are reserved in the license management database 54. Then, an encrypted content 75 to be reproduced is read from the content management database 48 according to content information in the inactive license based upon menu selection of contents contained in the package, a license for content corresponding thereto is read from the license management database 54, the encrypted content to be reproduced is decrypted using the cryptography key of the content license, and a decrypted content data 80 is outputted. An output of the decrypted content data 80 complies with a permission condition contained in a license. Since the utilization period or the number of utilization times is set as the permission condition contained in the license, when the condition is satisfied, the encrypted content is decrypted using the cryptography key and a decrypted content 80 is outputted. The CODIC decoder 82 is inputted with the decrypted content data 80 and the decrypted content data 80 is reproduced and outputted at the reproducing unit 84.

Figure 5A:
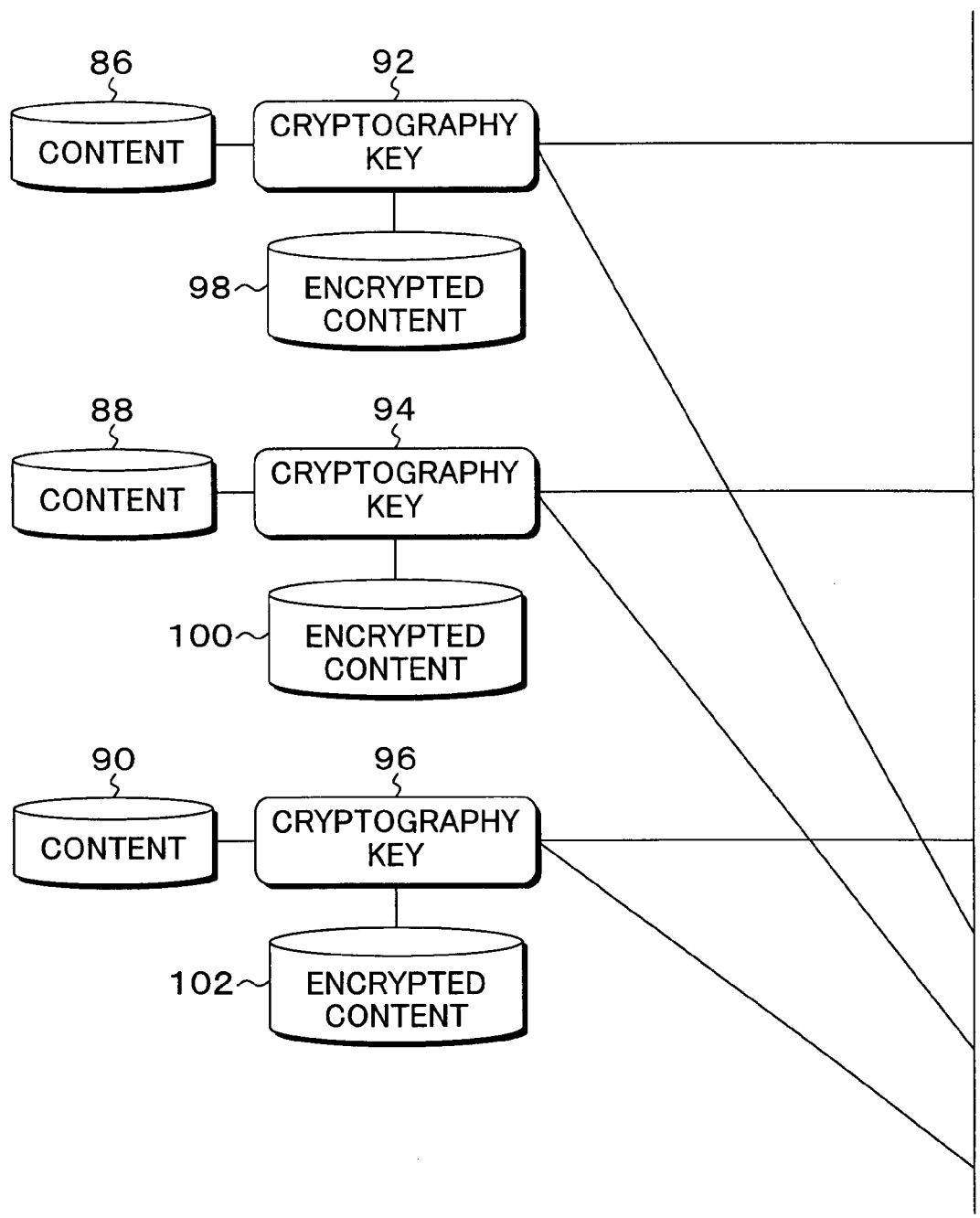
FIGS. 5A and 5B are explanatory diagrams showing encrypted contents sold as a package, an inactive license, and an activation license together with a license for individual sale according to the present invention.
Figure 5B:
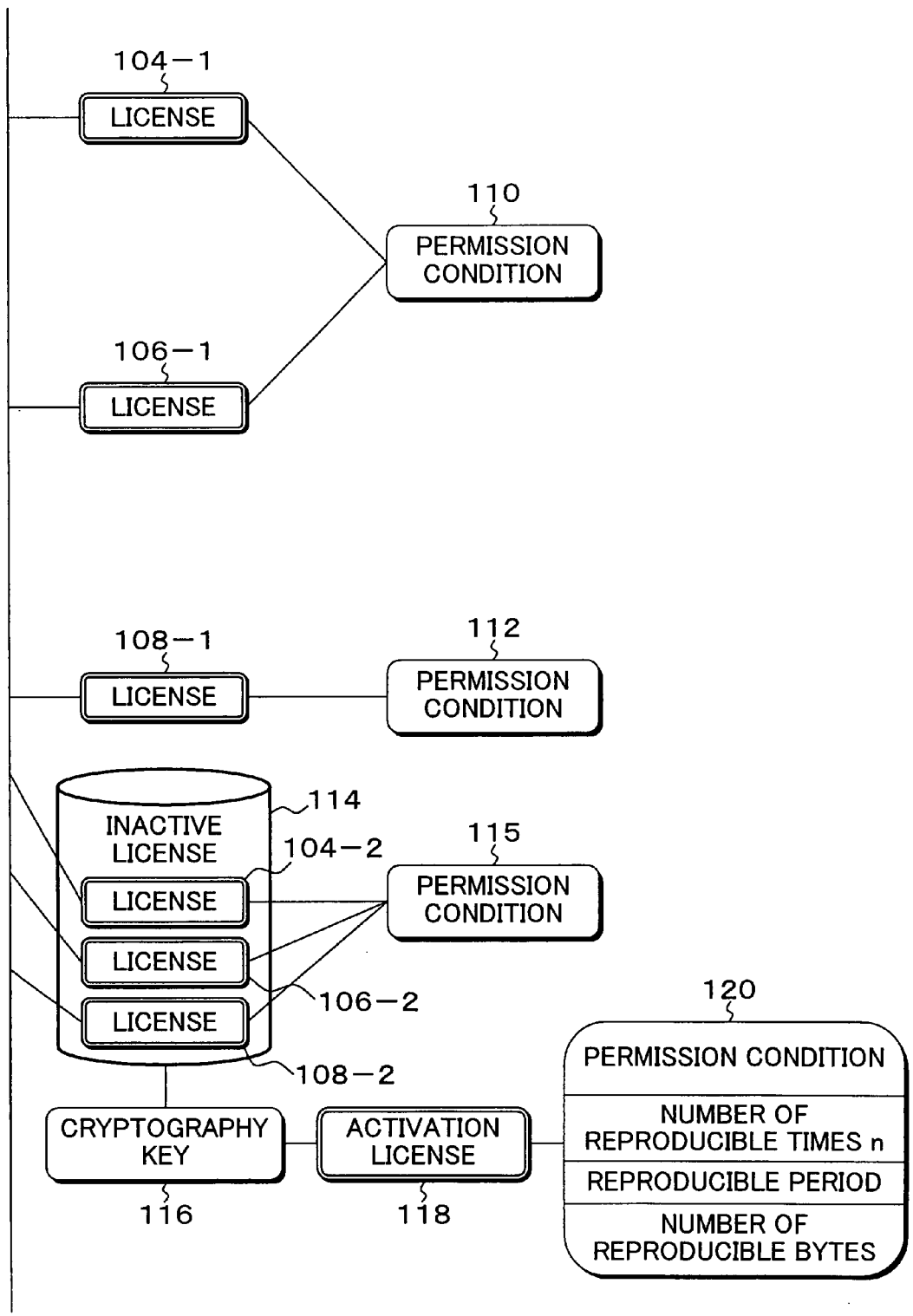

FIGS. 5A and 5B are explanatory diagrams showing encrypted contents, an inactive license, and an activation license together with licenses for individual sale. In FIGS. 5A and 5B, three contents 86, 88, and 90 are shown as examples, where licenses 104-1, 106-1, and 108-1 are generated for individual distributions of the contents 86, 88, and 90. A cryptography key 92 and a permission condition 110 are contained in the license 104-1, and the content 86 is encrypted using a cryptography key 92 of the license 104-1 so that an encrypted content 98 is generated. Therefore, regarding the content 86, the encrypted content 98 and the license 104-1 are distributed individually. Regarding the content 88, the license 106-1 is generated, a permission condition 110 and a cryptography key 94 are contained in the license 106-1, the content 88 is encrypted using the cryptography key 94, and an encrypted content 100 is generated, so that the encrypted content 100 and the license 106-1 are distributed individually. Regarding the content 90, the license 108-1 is generated, where a permission condition 112 and a cryptography key 96 are contained. The content 90 is encrypted using the cryptography key 96 of the license 108-1 to generate an encrypted content 102. Therefore, regarding the content 90, the encrypted content 102 and the license 108-1 are distributed individually. Contrary to the encrypted content and the license for each content, in the package sale according to the present invention, after a license containing the cryptography keys 92, 94, and 96 used for encryption of the contents 86, 88, and 90 and a permission condition 115 unique for package sale is generated, encrypted licenses 104-2, 106-2, and 108-2 obtained by encrypting respective licenses using a cryptography key 116 contained in an activation license 118 are generated, and an inactive license 114 is generated by collecting these encrypted licenses into one file. The activation license 118 contains the cryptography key 116 and a permission condition 120. Regarding the permission condition 120, permission conditions such as (1) the number of reproducible times n, (2) a reproducible period, and (3) the number of reproducible bytes are set for package sale of three contents 86, 88, and 90 in this example. The content of the permission condition 120 is basically similar to those of the permission conditions 110, 112, and 115 in individual license. In such package sale according to the present invention, the inactive license file 114 is distributed in the market using such a mobile medium such as a DVD without charge, but the activation license 118 containing the cryptography key 116 for decrypting the encrypted licenses 104-2, 106-2, and 108-2 contained in the inactive license 114 is distributed in the market for profit except for a trial package. On the other hand, the encrypted contents 98, 100, and 102 to be sold as a package are distributed as individual contents separately from the package sale, where when the contents to be sold as a package are reused, if the user apparatus has acquired encrypted contents 98, 100, and 102 in advance, it decrypts them as the encrypted contents to be sold as a package to utilize them. Therefore, according to the present invention, it is unnecessary to generate encrypted contents for the package sale again, where utilization of contents for package sale is realized by sharing encrypted contents in individual contents.

FIGS. 6A and 6B are explanatory diagrams of a permission condition file provided in the server shown in FIG. 1, FIG. 6A showing a content permission condition file 22, and FIG. 6B showing a package permission condition file 32. The content permission condition file 22 shown in FIG. 6A is composed of content ID, the number of reproduction times, reproducible period, the number of reproducible bytes and price. For example, referring to content ID=001, the number of reproduction times is three, the reproducible period expires on 1 Sep. 2006, the number of reproducible bytes is 1 MB, and the price is charge-free. The permission condition of the content ID001 is scheduled for the so-called charge-free trial utilization of content to a user. Regarding the next content ID002, the number of reproduction times is unlimited, the reproducible period expires on 1 Apr. 2006, the number of reproducible bytes is 4 MB, and the price is 700 yen. Thus, one of permission conditions preliminarily prepared in the content permission condition file 22 as templates is selected and it is used when a license is generated in FIG. 4. The package permission condition file 32 shown in FIG. 6B is composed of package ID, the number of reproduction times, reproducible period, the number of reproducible bytes, and price. For example, taking package ID=001 as an example, the number of reproduction times is three, the reproducible period expires on 1 Sep. 2006, the number of reproducible bytes is 1 MB, and the price is charge-free. This is a permission condition applied when an activation license is provided to a user without charge in package sale and trial utilization is performed. On the other hand, in package ID=002, the number of reproduction times is unrestricted, the reproducible period expires when 6 months elapses from a purchase month, and the price is 1500 yen. This means a permission condition applied, for example, when the package utilized under the permission condition of the package ID001 in the trial manner is then utilized by the user for profit. Regarding the contents in the package permission condition file 32, templates of a plurality of permission conditions are prepared according to necessity and a condition required is selected from the permission conditions, so that it is used as the permission condition 115 when the inactive license file 114 show in FIG. 4 is generated.

FIG. 7 is an explanatory diagram of a generation function of a license for package sale in the server 10 shown in FIG. 1, where a case that the three contents 86, 88, and 90 shown in FIGS. 5A and 5B are configured as a package is taken as an example. In FIG. 7, in the server 10, content licenses 104-1, 106-1, and 108-1 are generated corresponding to the three encrypted contents 98, 100, 102 to be sold as a package. A cryptography key 92 and a permission condition 115 are contained in the content license 104-1, a cryptography key 94 and the same permission condition 115 are contained in the content license 106-1, and a cryptography key 96 and the permission condition 115 are contained in the content license 108-1. After an encrypting processing 122 is performed to the three content licenses 104-1, 106-1, and 108-1 for package sale thus generated using the cryptography key 116 for an activation license, a packaging processing 124 is performed, so that an inactive license 114 storing the encrypted content licenses 104-2, 106-2, and 108-2 in one file is generated. On the other hand, regarding the cryptography key 116 for an activation license, an activation license 118 containing the cryptography key 116 and the permission condition 120 of the package is generated by the activation license generation 126. The encrypted contents 98, 100, and 102, and the inactive license 114 generated in the server 10 are provided to the user apparatus 12 by storing them in a mobile medium 42 to distribute the mobile medium 42. On the other hand, regarding the activation license 118, when the server 10 receives a package purchase request from the user apparatus 12 where purchasing contract is approved, the activation license 118 is distributed via the network 44, the encrypted licenses 104-2, 106-2, and 108-2 in the inactive license file 114 are decrypted so that decryption and utilization of the encrypted contents 98, 100, and 102 can be made possible.

FIG. 8 is an explanatory diagram of a data structure of the inactive license 114 generated by the server 10 of the present invention. In FIG. 8, the inactive license 114 is composed of header 130 storing the number of elements and the like, element information 132, the number of elements 134-1 to 134-n corresponding to the number n of contents for package, and electronic signature 136. The element information 132 includes individual element information pieces 138-1 to 138-n corresponding to the elements 134-1 to 134-n, as shown in a lower side thereof. Regarding the individual element information pieces 138-1 to 138-n, each individual element piece is composed of content ID 140, content information 141, encrypted content file name 142, license identification information 144 such as a permission condition, offset of element in file 146, and element decrypting information 148 such as a cryptography block size, as shown on a lower side of the leading individual element information piece 138-1. On the other hand, regarding the elements 134-1 to 134-n, each element is composed of size 150 and encrypted license key 152 which is a license key encrypted using a cryptography key of an activation license, as shown on an upper side of the leading element 134-1. Here, the encrypted license key 152 in the element 134-1 is data obtained by encrypting the cryptography key 92 using the cryptography key 116 of the activation license 118 in the case of the encrypted license 104-2 shown in FIGS. 5A and 5B.

Figure 9:
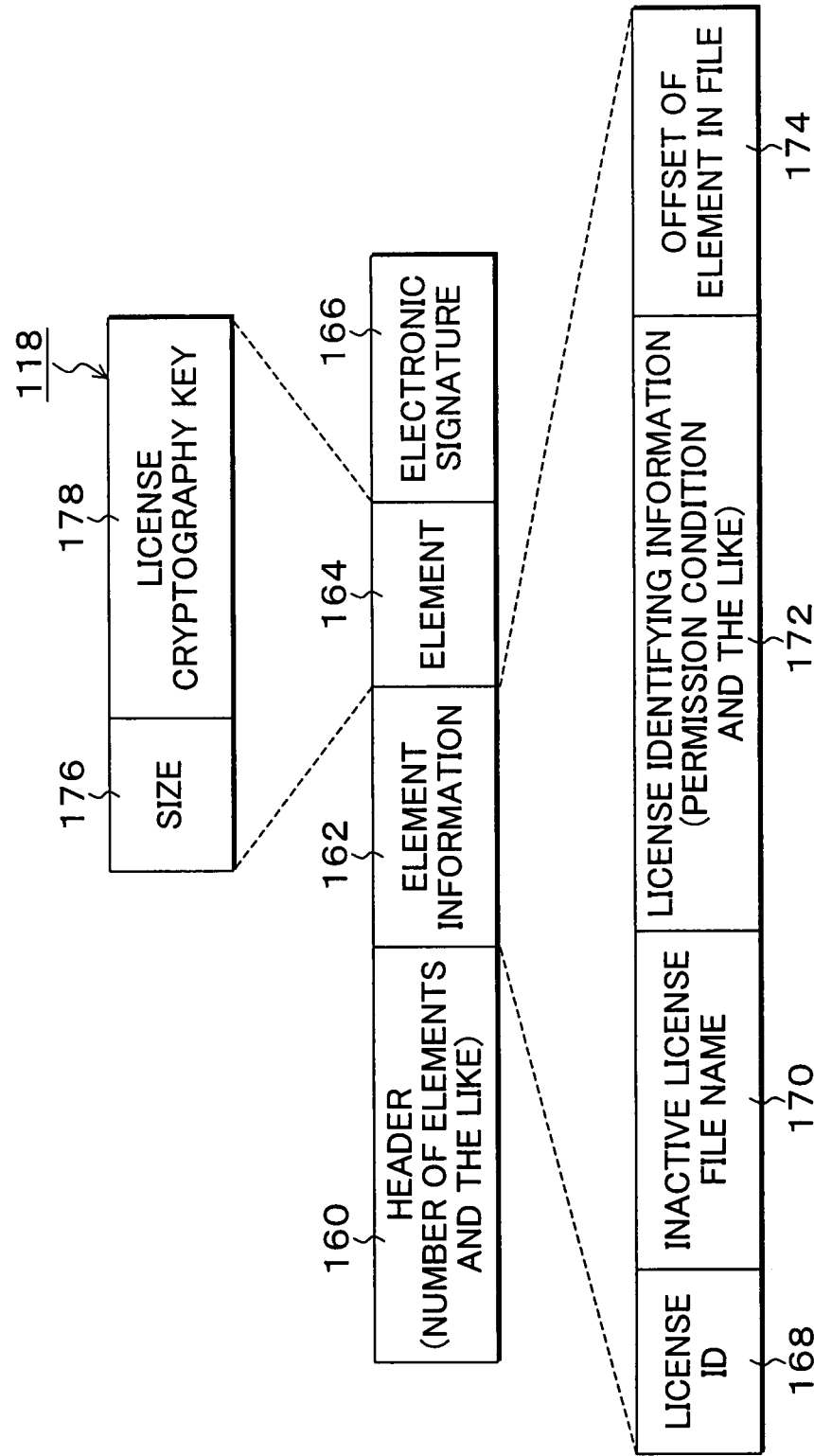
FIG. 9 is an explanatory diagram of a data structure of an activation license generated in the present invention.

FIG. 9 is an explanatory diagram of a data structure of an activation license generated according to the present invention. In FIG. 9, the activation license 118 is composed of header 160 such as the number of elements, element information 162, element 164, and electronic signature 166. In this case, since the number of elements is one, the numbers of the element information 162 and the element 164 are each one. The element information 162 is composed of license ID 168, inactive license file name 170, license identification information 172 such as permission condition, and offset in file of element 174, as shown on a lower side thereof. The element 164 is composed of size 176 and inactive license cryptography key 178, as shown on an upper side thereof.

Figure 10:
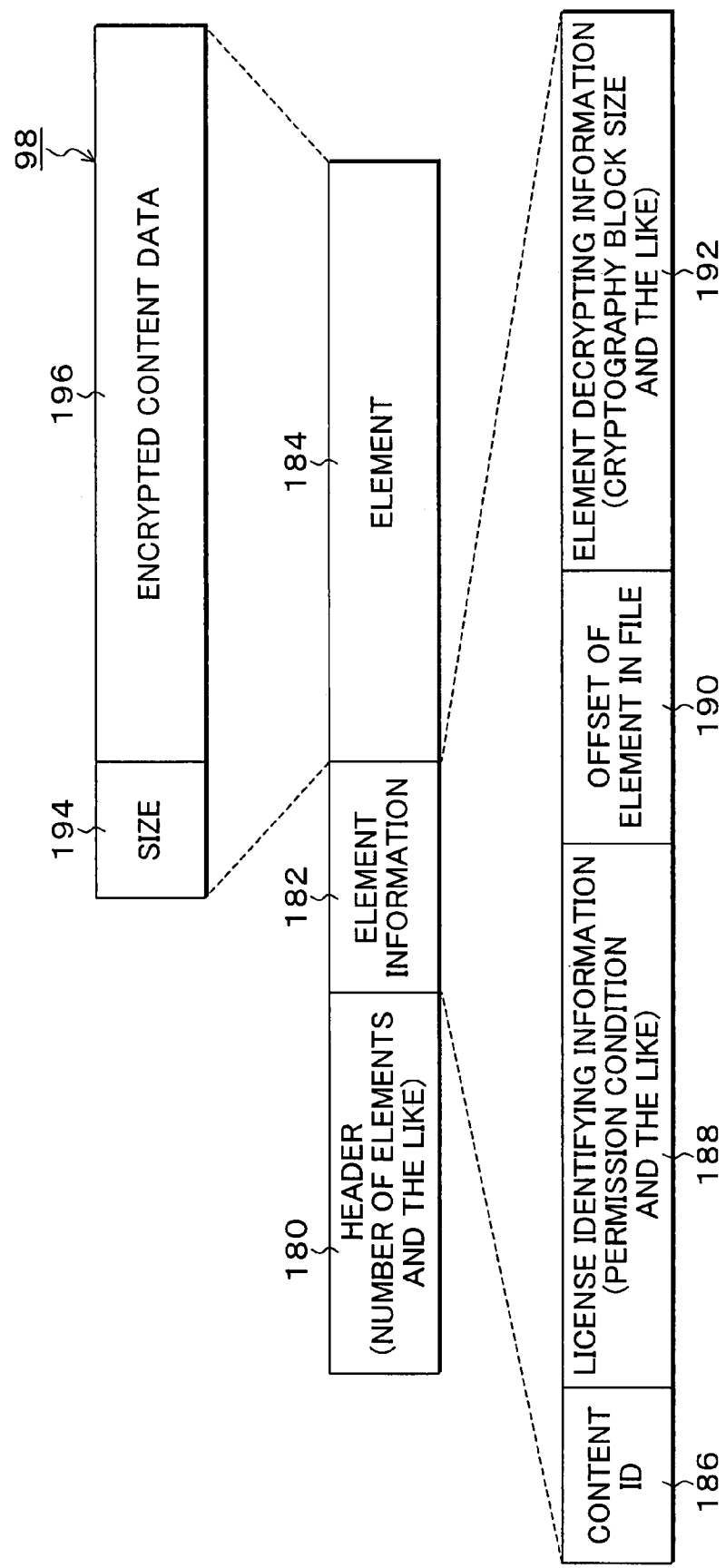
FIG. 10 is an explanatory diagram of a data structure of an encrypted content generated in the present invention.

FIG. 10 is an explanatory diagram of a data structure of an encrypted content generated according to the present invention. In FIG. 10, the encrypted content 98 is composed of header 180 such as the number of elements, element information 182, and element 184. In this case, since the number of elements is one, the number of the element information 182 is also one. The element information 182 is composed of content ID, license identification information 118 such as a permission condition, offset in file of element 190, and element decrypting information 192 such as a cryptography block size, as shown on a lower side thereof. The element 184 is composed of size 194 and encrypted content 196, as shown on an upper side thereof.

Figure 11B:
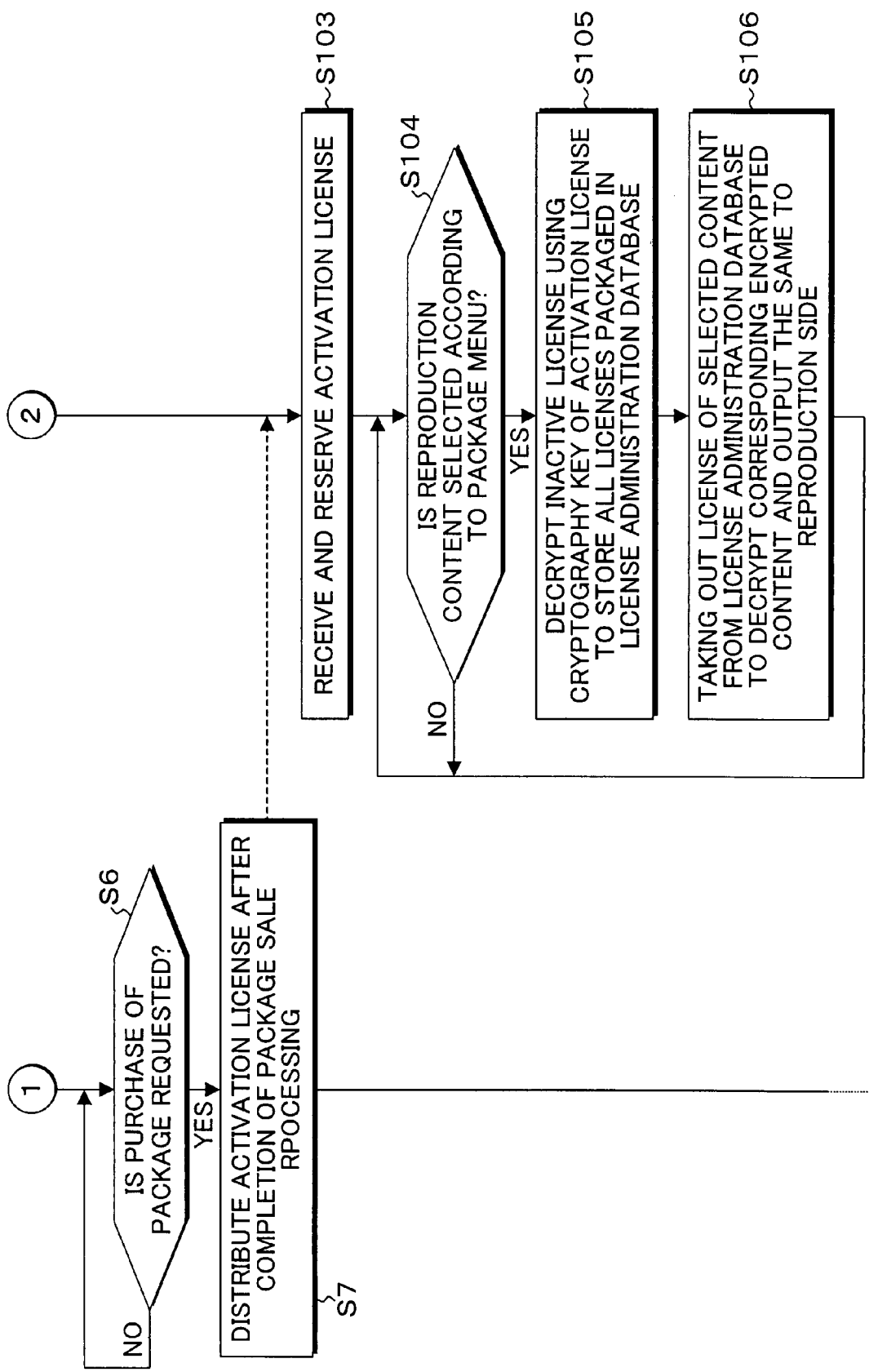

FIGS. 11A and 11B are time charts of a content distribution processing and a utilization processing in the server 10 shown in FIG. 1 and the user apparatus 12 shown in FIG. 2. In FIGS. 11A and 11B, the server 10 individually generates content licenses including a content cryptography key and a permission condition for respective encrypted contents for ordinary sale of contents to circulate the encrypted contents and the content licenses separately from each other at step S1. When a plurality of contents are sold as a package, regarding a plurality of contents for package sale, the server 10 generates a content license for package sale including the same cryptography key as used for content encryption for individual sale and a permission condition in package sale at step S2. Then, the server 10 encrypts licenses of respective contents for package sale using a cryptography key contained in the activation license and collects the encrypted licenses in one file to generate an inactive license at step S3. Subsequently, the server 10 generates an activation license including an activation cryptography key used for encrypting the content license in the inactive license and a permission condition for package sale at step S4. The server 10 instructs distribution in a state that the inactive license has been stored in a mobile medium such as a DVD together with the encrypted contents according to necessity at step S5. On the other hand, the user apparatus 12 reads and reserves the inactive license from the mobile medium provided from the server 10 at step S101. Since a content menu for package sale is contained in the inactive license, the user apparatus 12 develops a package menu according to application and selects a desired package from the developed menu to issue a purchase request to the server 10 at step S102. The server 10 which has received the purchase request for a package from the user apparatus 12 makes determination about the purchase request for a package at step S6, it distributes a requested activation license to the user apparatus 12 after package sale completion according to an accounting processing such as user's credit settlement at step S7. The user apparatus 12 receives and reserves the activation license distributed from the server 10 at step S103. Next, when the user apparatus 12 selects a reproduction content desired by a user from the package menu at step S104, it decrypts a plurality of encrypted licenses contained in the inactive license using the cryptography key of the activation license to store them in the license management database 54 at step S105. The user apparatus 12 decrypts the selected encrypted content taken out of the license management database 54 using a corresponding license to output the decrypted content to the reproduction side at step S6.

Figure 12:
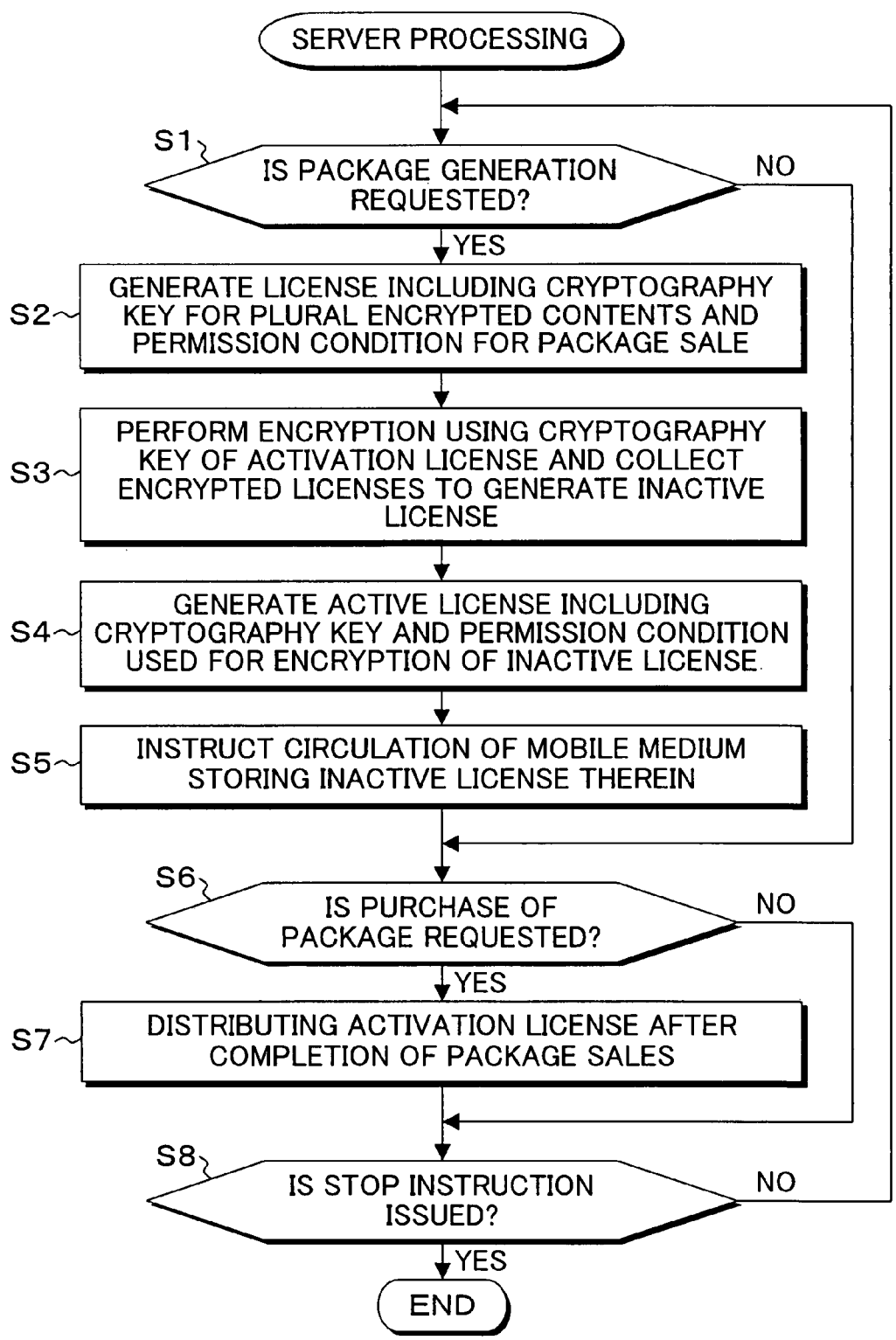
FIG. 12 is a flowchart of the content distribution processing performed by the server shown in FIG. 1.

FIG. 12 is a flowchart of a content distribution processing performed by the server 10 shown in FIG. 1. In FIG. 2, when the server 10 determines a package generation request at step S1, it generates a content license including a cryptography key and a permission condition for each plural encrypted contents for a package at step S2. The server 10 encrypts content licenses generated for respective encrypted contents using the cryptography key included in the activation license and collects them in one file to generate an inactive license at step S3. Next, the server 10 generates an activation license including the cryptography key used for encryption of content licenses in the inactive license and a permission condition for package sale at step S4. Then, the server 10 instructs processing of a mobile medium storing the inactive license, such as a CD or DVD, at step S5. The server 10 checks presence/absence of a purchase request of a package from the user apparatus at step S6, and when it determines a purchase request, it distributes an activation license to the user apparatus after a package sale processing is completed according to accounting utilizing a credit card or the like at step S7. The processing from steps S1 to S7 is repeated until a stop instruction is issued at step S8.

Figure 13A:
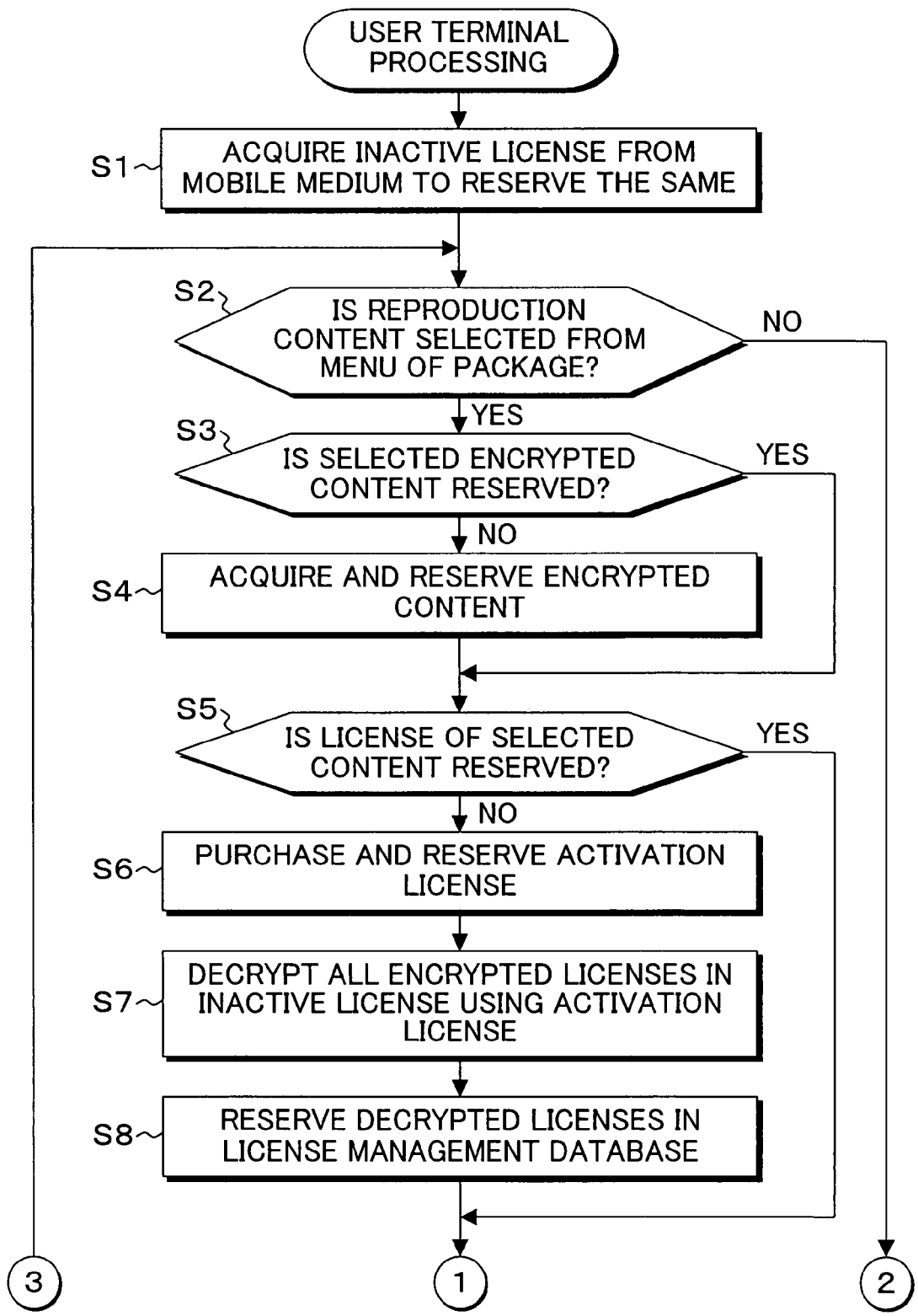
FIGS. 13A and 13B are flowcharts of the content utilization processing performed by the user apparatus shown in FIG. 2.
Figure 13B:
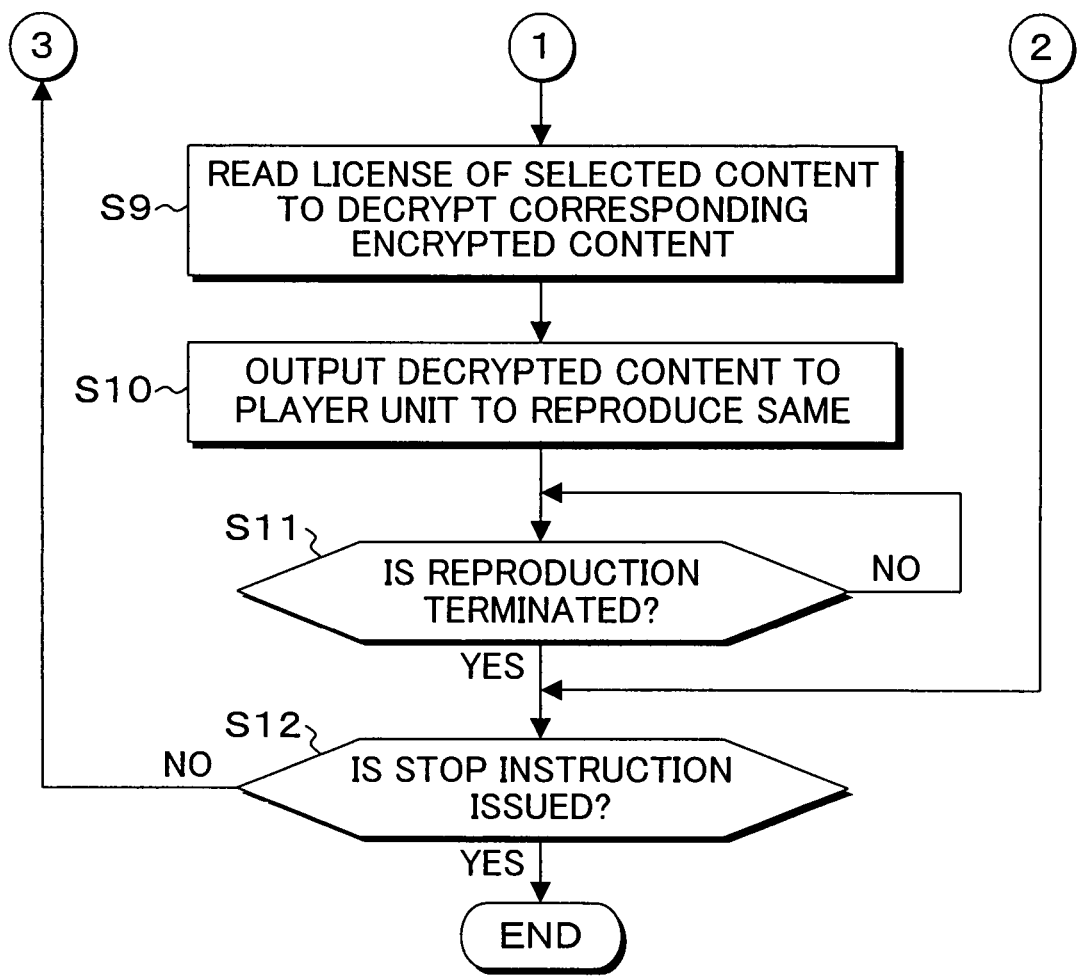

FIGS. 13A and 13B are flowcharts of a content utilization processing in the user apparatus 10 shown in FIG. 2. In FIGS. 13A and 13B, the user apparatus 12 acquires and reserves the inactive license from such a mobile medium as a DVD at step S1, and it checks selection of reproduction content to form a menu of the package in this state at step S2. When the reproduction content from the package menu is selected, the processing proceeds to step S3, where the user apparatus 12 checks presence/absence of reservation of an encrypted content corresponding to the selected content. Unless the encrypted content is reserved, the processing proceeds to step S4, where the user apparatus 12 acquires and reserves the encrypted content. The acquisition of the encrypted content is performed through reading from a mobile medium such as a DVD or a distribution request to the server 10. Next, the user apparatus 12 checks presence/absence of reservation of a license of the selected content at step S5. Unless the license is reserved, the user apparatus 12 issues a purchase request of an activation license to the server 10 and reserves the distributed activation license at step S6. Subsequently, the user apparatus 12 decrypts all the encrypted licenses in the inactive license using the cryptography key of the activation license at step S7 and reserves the decrypted licenses in the license management database at step S7. The user apparatus 12 reads a license of the selected content from the license management database to decrypt a corresponding encrypted content at step S9. The user apparatus 12 outputs the decrypted content to the player unit to cause the player unit to reproduce the content at step 10. Of course, output of the decrypted content to the player unit and reproduction thereof at step S10 comply with the permission condition contained in the license read at step S9. When the user apparatus 12 determines reproduction termination at step S11, it checks presence/absence of a stop instruction at step S12, and the user apparatus 12 repeats the processing from step S2 until it receives the stop instruction.

Figure 14:
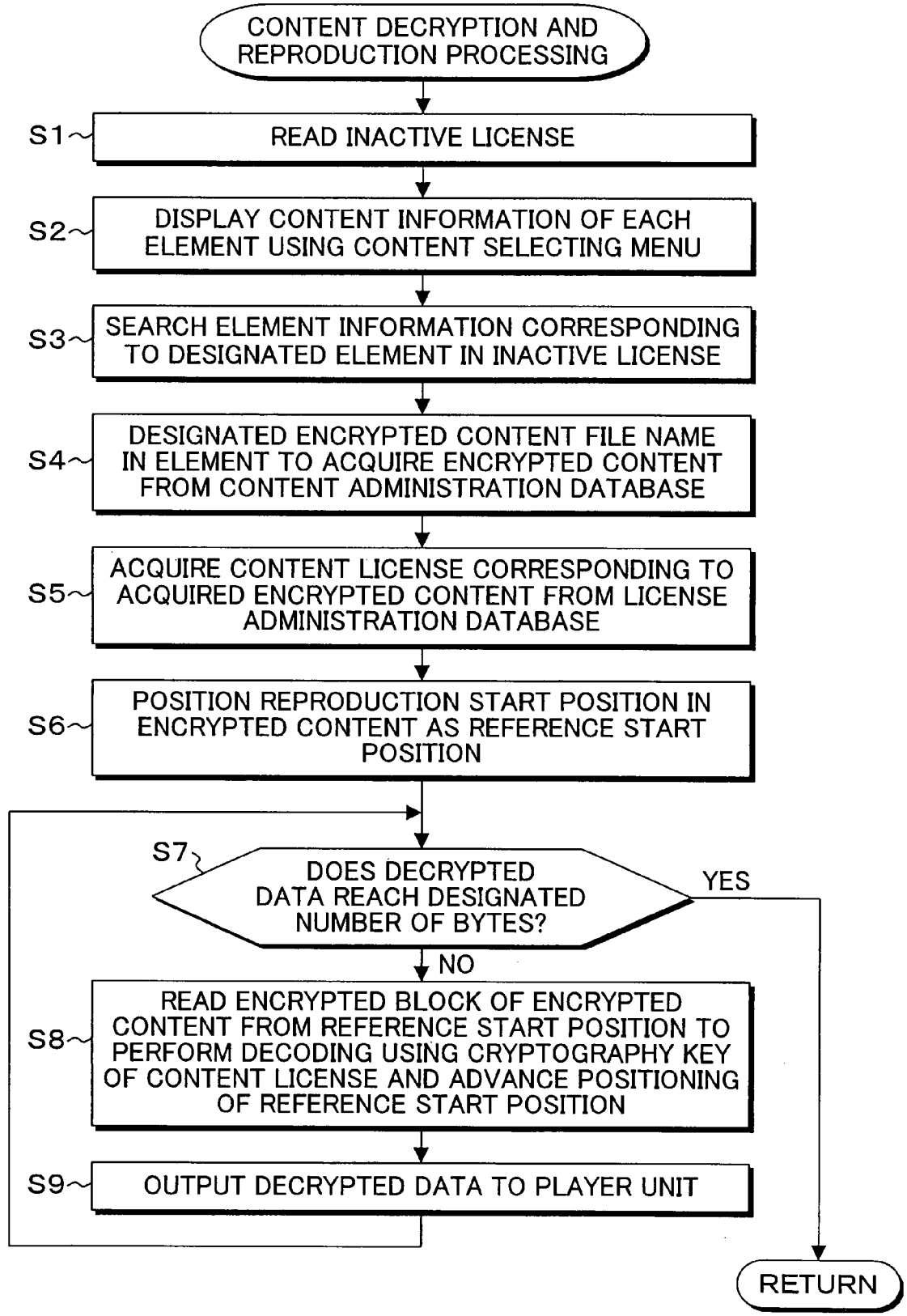
FIG. 14 is a flowchart of details of a recovery processing of encrypted contents sold as a package at step S9 shown in FIGS. 13A and 13B.

FIG. 14 is a flowchart of details of an encrypted content recovery processing sold as a package at step S9 shown in FIGS. 13A and 13B. In the content decryption and reproduction processing, the user apparatus 12 first reads the inactive license 114 having the data structure shown in FIG. 8 at step S1 and displays content information of each element with a content selection menu at step S2. Then, the user apparatus 12 searches individual element information 138-1 in the element information 132 corresponding to a designated element in the inactive license 114, for example, the element 134-1, at step S3. Then, the user apparatus 12 designates the encrypted content file name 142 of the individual element information 138-1 to acquire a corresponding encrypted content from the content management database 48 at step S4. Subsequently, the user apparatus 12 acquires a content license corresponding to the individual element information 138-1 from the license management database 54 at step S5. Next, the user apparatus 12 positions a position in the encrypted content corresponding to a reproduction start position designated by a user as a reference start position of the encrypted content data 196 in the encrypted content 98 shown in FIG. 10 at step S6, it checks whether or not the reference start position reaches the designated number of bytes at step S7, and it terminates reproduction of the content to branch to RETURN when the reference start position reaches the designated number of bytes. Unless the reference start position reaches the designated number of bytes, the processing proceeds to step S8, where the user apparatus 12 reads the encrypted block from the reference start position to decrypt it using the cryptography key of the content license and updates positioning of the reference start position. The user apparatus 12 outputs the data decrypted at step S8 to the player unit at step S9 and it returns back to checking performed at step S7.

Incidentally, the present invention is not limited to the above embodiment, and it includes proper modification which does not damage the object and the advantage. The present invention is not limited by numeral values shown in the above embodiment.

The invention claimed is:

1. A non-transitory computer-readable storage medium storing a content distribution program that causes a server, which distributes a plurality of contents that are provided for distribution individually and in a package of more than one content, to execute:
   individually encrypting each of the contents to be distributed;
   individually generating a license corresponding to each encrypted content;
   generating an activation license for package distribution of more than one content;
   generating an inactive license packaged in one file by encrypting the licenses of each of the encrypted contents included in the package distribution using a cryptography key of the activation license;
   outputting the inactive license for the package distribution along with the encrypted contents and the corresponding individual licenses to a mobile medium recorder; and
   when receiving a request for the package distribution from a user terminal having the inactive license, the encrypted contents and the corresponding individual licenses, distributing the activation license to the user terminal;
   wherein the activation license includes the cryptography key for encrypting the licenses of the encrypted contents, and a permission condition of the encrypted contents, and
   the inactive license includes combined metadata describing an album with contents to be packaged in addition to the cryptography key and the permission condition.

2. The storage medium according to claim 1, when the inactive license is distributed, the inactive license is stored with the encrypted contents in a mobile medium to provide the mobile medium to the user apparatus.

3. The storage medium according to claim 1, wherein
   the user apparatus reads a plurality of encrypted contents corresponding to the metadata of the inactive license to reproduce contents according to the constitution of the album.

4. A content distribution method for distributing a plurality of contents that are provided for distribution individually and in a package of more than one content, comprising:
   individually encrypting each of the contents to be distributed;
   individually generating a license corresponding to each encrypted content;
   generating an activation license for package distribution of more than one content;
   generating an inactive license packaged in one file by encrypting the licenses of each of the encrypted contents included in the package distribution using a cryptography key of the activation license;
   outputting the inactive license for the package distribution along with the encrypted contents and the corresponding individual licenses to a mobile medium recorder; and
   when receiving a request for the package distribution from a user terminal having the inactive license, the encrypted contents and the corresponding individual licenses, distributing the activation license to the user terminal,
   wherein
   the activation license includes the cryptography key for encrypting the licenses of the encrypted contents, and a permission condition of the encrypted contents, and
   the inactive license includes combined metadata describing an album with contents to be packaged in addition to the cryptography key and the permission condition.

5. A content distribution apparatus which distributes a plurality of contents that are provided for distribution individually and in a package of more than one content, comprising:
   an encrypted content generating unit which individually encrypts each of the contents to be distributed;
   a license generating unit which generates a license corresponding to each encrypted content;
   an activation license generating unit which generates an activation license for package distribution of more than one content;
   an inactive license generating unit which generates an inactive license packaged in one file by encrypting the licenses of each of the encrypted contents included in the package distribution using a cryptography key of the activation license;
   an inactive license outputting unit which outputs the inactive license for the package distribution along with the encrypted contents and the corresponding individual licenses to a mobile medium recorder; and
   an activation license distributing unit which when receiving a request for the package distribution from a user terminal having the inactive license, the encrypted contents and the corresponding individual licenses, distributes the activation license to the user terminal;
   wherein
   the activation license includes the cryptography key for encrypting the licenses of the encrypted contents, and a permission condition of the encrypted contents, and
   the inactive license includes combined metadata describing an album with contents to be packaged in addition to the cryptography key and the permission condition.

* * * * *